Jan. 30, 1962 M. A. POWERS 3,019,186
FLUID FILTERING MEDIUMS AND METHOD OF MAKING THE SAME
Filed Dec. 12, 1957
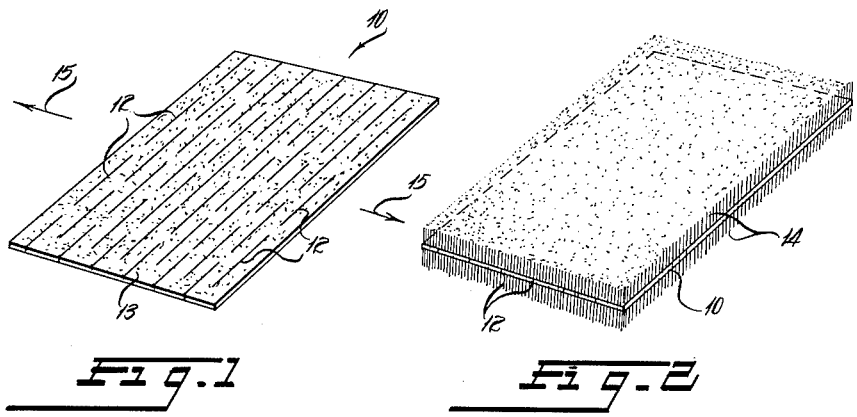
Fig. 1  Fig. 2
Fig. 3  Fig. 6
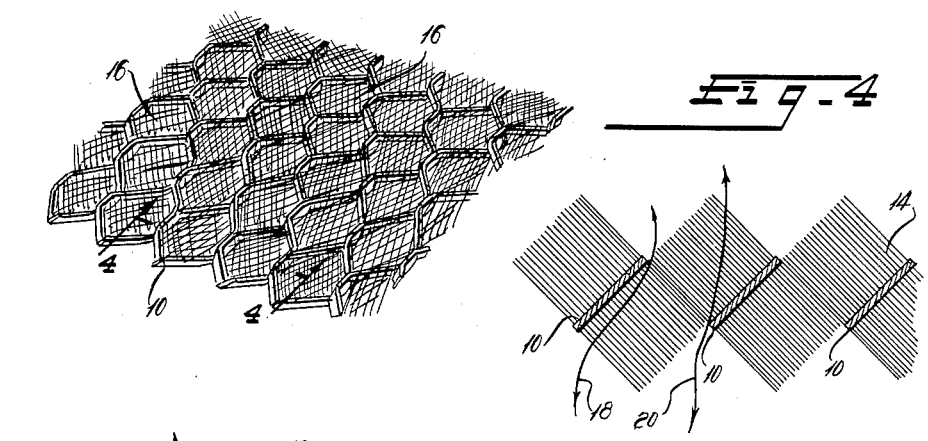
Fig. 4
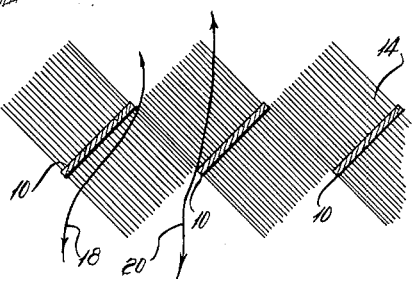
Fig. 7
Fig. 5
INVENTOR
MILTON A. POWERS
BY
ATTORNEYS United States Patent Office 3,019,186
Patented Jan. 30, 1962

3,019,186
FLUID FILTERING MEDIUMS AND METHOD
OF MAKING THE SAME
Milton A. Powers, 655 Bedford, Grosse Pointe 30, Mich.
Filed Dec. 12, 1957, Ser. No. 702,300
9 Claims. (Cl. 210—506)

This invention relates to a new fluid filtering medium construction and method of making the same wherein a fibrous flock material is attached to an expanded sheet member such as expanded metal or other suitable material. Such a filtering medium is suitable for use in filtering either gases, vapors or liquids.

Filtering mediums comprising a wire having short fibrous flock material attached thereto have been known in the art for many years. In all of these filtering mediums, the screen had a relatively fine mesh with openings 1/8 inch and smaller. The flock was of very short length varying from about .010 inch to 1/16 inch. It was applied to an adhesive-coated screen with the assistance of mechanical vibration or simply by the natural electrostatic action of the flock blown in an air stream which causes the fibers to adhere endwise to the wire. Such products have found widespread use for ornamental purposes, as for example on radio cabinets to cover the loud-speaker without interfering with the speaker's sound output, but have proved quite worthless as an effective filtering medium. One of the primary difficulties with such filtering mediums is that there are open or nearly open spaces in the central area of the mesh. If more flock is applied to the screen in attempts to provide tortuous fluid passageways through the open areas, the wires of the screen become covered with a solid bristle of flock. The resulting assembly remains useless as a filter because the individual fibers of flock are too closely packed to allow liquid flow in proximity to the wire and some open or nearly open spaces still remain.

Filters have been made by a random application of flock to a screen by first coating the screen with a suitable adhesive and then applying flock to one or both sides of the screen by blowing or shaking from a vibrating hopper. Most of the fibers so applied adhere to the screen in a flatwise manner, thus presenting a filter medium having an extremely short "depth" of flow for the fluid being filtered as it passes through the flat layer of fibers. Even a slight accumulation of foreign matter deposited on the fibers of such a filter results in clogging and necessitates frequent cleaning. Consequently, various filters produced in this manner have not met with any substantial degree of success.

An object of this invention is to provide an improved filtering medium having an increased depth of filtering action over that obtained in convenional flocked screen type filters, the improved results being achieved by a novel assembly comprising a sheet member such as expanded metal or other suitable material and a fibrous flock material secured thereto.

Another object of this invention is to provide a filtering medium having a progressive filtering action comprising an expanded sheet member having a fibrous flock material attached endwise to opposite sides thereof, the progressive filtering action resulting from crowding together at the centers of the fluid passageways adjoining fibers that are attached on the opposite sides of the member at the edges of the fluid passageways therethrough.

A further object of this invention is to provide an improved fluid filtering medium which is equally effective to filter fluids flowing in either direction through the medium, may be easily cleaned by washing, and has a long service life.

Still another object of this invention is to provide a novel method of making a filtering medium from a sheet member capable of being expanded to provide fluid passageways therethrough and a fibrous flock material.

Other objects and advantages of the invention will become apparent from the following detailed description and drawing, in which:

FIGURE 1 is a perspective view of an adhesive-coated sheet member having slits therethrough which allow the member to be expanded to provide fluid passageways therethrough;

FIGURE 2 is a perspective view of the sheet member of FIGURE 1 after it has been flocked on opposite sides thereof with a suitable fibrous flocking material which is attached endwise to the member;

FIGURE 3 is a perspective view of the flocked sheet member of FIGURE 2 after it has been expanded to provide fluid passageways therethrough;

FIGURE 4 is a view taken along the line 4—4 of FIGURE 3;

FIGURE 5 is a view similar to FIGURE 4 but illustrating another embodiment of this invention; and FIGURES 6 and 7 are transverse sectional views of other forms of sheet members suitable for use in this invention.

This invention resides in a novel fluid medium construction wherein a filtering action of increased depth over any heretofore achieved conventional flocked screen filters is achieved by providing tortuous fluid passageways through closely spaced individual fibers of flock material disposed preferably in substantially side by side relation in openings through an expanded sheet member. Such sheet members are well known by the term "expanded metal," it being understood of course that the sheet member as used in this invention may be of suitable materials other than metal and have suitable openings formed therein by methods other than "expanding" such as by punching, etc.

Referring now to FIGURE 1, there is illustrated a flat sheet member 10 having parallel rows of elongated spaced slits 12 therethrough which are of substantially equal length. The slits 12 in each row are alternately spaced in relation to the slits in the rows adjacent thereto so that each slit is substantially opposite the space between slits in adjacent rows as shown.

The sheet member 10 may be of any suitable material having sufficient strength and rigidity for the service conditions to which the filtering medium will be subjected. These of course vary widely depending upon whether the fluid is a gas, vapor or liquid. Examples of suitable materials are kraft paper, plastic-coated paper such as polyethylene-coated waterproof paper, light or heavy aluminum foil, and light galvanized sheet steel or the like.

The flat sheet 10 is coated with a suitable adhesive indicated by the stipples 13, in any conventional manner such as spraying, dipping, brushing or rolling. While the adhesive is still wet, substantially equal length fibers 14 of a resilient flocking material such as rayon, Saran, nylon, wool, cotton, acetate, polyethylene, etc. are attached endwise to the sheet member 10 as shown in FIGURE 2. The fibers are preferably stiff enough to be self-supporting. After both sides of the sheet member 10 have been flocked with a desired number of fibers 14, it is extended or expanded by force in a direction at right angles to the slits 12, as indicated by the arrows 15 in FIGURE 1, so that the slits are spread open to form fluid passageways 16 therethrough as shown in FIGURE 3. This expanding or stretching results in the surfaces of the sheet being inclined at an angle to its original plane surface before expansion as shown in FIGURE 4, the amount of incline being at least sufficient to spread open the slits and move the fibers 14 angularly to a degree that they extend transversely of said fluid passageways. It is desired that the sheet member 10 be expanded an amount sufficient to incline the surfaces thereof to an angle of approximately 45 degrees so that the fibers 14 on opposite sides thereof will be substantially parallel. Thus as shown in FIGURE 4, the fibers 14 on opposite sides of the sheet member 10 at the edges of the fluid passageways 16 are closely adjoining each other along their lengths with the free ends of the adjoining fibers on one side of the sheet member being adjacent the attached ends of the fibers on the opposite side of the sheet member. The fibers 14 should have a length at least one half the maximum dimention across the fluid passageways 16 so that the fibers on opposite sides of the sheet member will overlap at the center of the passageways so that there will be no free air space extending therethrough. However, it is preferred that the fibers be substantially equal to the maximum dimension across the fluid passageways 16 to provide a filtering medium of greater depth as illustrated in the drawings. With such a construction, the fluid being filtered must flow through both sets of fibers with the entire length of each set of fibers extending across a passageway 16. This prevents any possible shortcut for the fluid which at every point of entry into the filtering medium must pass through a minimum of at least one full set of fibers on one side of the sheet member as illustrated by the fluid flow arrows 18 and 20 in FIGURE 4. Of course a majority of the fluid passes in an area between these two flow arrows and thus a double filtering action is achieved by the fluid passing through both respective sets of the fibers 14 on opposite sides of the sheet member 10.

A filter medium of the above novel structure is a sturdy and relatively rigid member having sufficient strength to maintain its shape without reinforcement or additional framing when installed as a filter element. This is due either to the inherent rigidity of the expanded sheet or by interlocking of adjoining fibers from opposite sides of the sheet member at the edges forming the fluid passageways, or by combination of both of these reinforcing actions.

While the fluid passageways 16 in sheet 10 have been described as being conveniently formed by the well known "expanded metal" method, it should be understood that other methods may be employed to provide the necessary inclined surfaces on the sheet adjacent the openings through the sheet. For example, the openings may be formed by punching the sheet so that lips or the like would be pushed outwardly from the sheet to provide the inclined surfaces. It is not necessary that the openings 16 be of any particular configuration so long as tortuous fluid passageways are provided throughout the space therein by the fibrous flock material attached to the sheet.

FIGURES 6 and 7 are illustrative of suitable sheet members of other construction wherein as shown in FIGURE 6, a sheet member 30 is punched to form a lip section 32 and openings 34. FIGURE 7 is illustrative of another embodiment wherein a short member 36 is punched so that opposed lip sections 38 and 40 may be folded in opposite directions to form openings 42. In each of these sheet constructions, fibrous flock material may be attached thereto in the same manner as described hereinbefore. It should be understood that in all embodiments of this invention, the fibers may be attached to only one side of the sheet member with good results; however, it is preferred for best results to have the fibers attached to both sides.

Referring now to FIGURE 5, there is shown another embodiment of this invention wherein the sheet member 10 is expanded to incline the surfaces thereof more than 45 degrees, as for example about 50 degrees as shown, so that the adjoining fibers 14 from opposite sides of the sheet member 10 at the edges of the openings 16 are inclined toward each other to crowd the fibers together for progressively greater filtering action between opposite ends of the tortuous fluid path so formed through the filtering medium. It is readily apparent that as a fluid following a path as indicated by flow arrow 22 approaches the central portion of fluid passageways 16, the tortuous fluid paths between fibers become increasingly narrow toward the center of the passageways 16, or the point where fibers on opposite sides of the sheet member come in contact with each other. This provides a progressive type filtration; that is, large particles of foreign matter in the fluid are caught in the outermost wider spaces at the outer surface of the filtering medium while smaller particles move further along before they are retained. Thus much more foreign matter may be collected before the filtering medium clogs than is possible with conventional flocked screen filters.

It is readily apparent in the foregoing constructions that the filtering mediums of this invention may be used with the flow of fluid being in either direction with equally effective results. Thus the user can insert the filter medium of this invention in the fluid line without regard to direction of flow which is a highly desirable feature for foolproof operation. Another advantage of this invention is that by proper selection of the sheet member, and by using a waterproof adhesive, the filtering medium of this invention is suitable for filtering liquids, or if used for filtering gases such as air, it may be easily washed as the need may arise, resulting in a very long service life. The foregoing advantages are not only an improvement over prior art filters, but the filtering medium of this invention is extremely inexpensive and simple to manufacture as is readily apparent from the materials that may be used and the method of construction employed.

In attaching the fibers of flock material to the sheet member 10, it is preferred that the fibers have an electrostatic charge thereon. The fibers are blown by a circulating air stream against the sheet member which is either grounded or supplied with an electrostatic charge opposite to the electrostatic charge on said fibers so that as the fibers approach the sheet member, they will so position themselves by the attractive force between the sheet member and fibers that they impinge upon the adhesive in an endwise manner whereby their ends are partially embedded in the wet adhesive film. Because the fibers all have like electrostatic charges thereon, they are repelled by each other and as they approach the sheet member move as far away as possible from the fibers already attached thereto so that each individual fiber will seek the largest available space on the adhesive-coated sheet member and all fibers will tend to be substantially uniformly spaced from each other. After one side of the sheet member has been flocked to a desired degree, it is reversed in the air stream so that the other side will have attached thereto a like amount of fibers in the same manner.

The electrostatic charge on the fibers of flocking material may be applied by the action of the fibers themselves while circulating through the air stream, or an additional charge may be applied thereto by passing the fibers through an electric field. Of course the fibers of some flocking materials will pick up an electrostatic charge more readily than others. With materials which will not pick up a charge of sufficient strength, it is necessary to apply an additional charge by passing the fibers through an electric field created by any suitable means such as a Van de Graaf electrostatic generator. In addition, it may be advantageous to accentuate this action by applying an opposite charge to the sheet member itself whereby the charged flock will be accelerated endwise against the wet sheet by the attracting force of the opposite charge. With the additional electrostatic charge so applied to the fibers, endwise attachment thereof to available wet adhesive space is assured thus providing a uniformly distributed pattern of fibers on the sheet member at closely spaced points.

Depending upon the nature of the adhesive used, the sheet member 10 may be expanded, or have the openings formed therein by other methods, upon completion of the flocking operation while the adhesive is still wet, or the openings may be formed after the adhesive is cured. If the cured adhesive is relatively brittle, it is preferred that the curing take place after the openings in sheet member have been formed so as not to risk flaking of the adhesive that may otherwise occur. With some forms of epoxy type or rubber adhesives, it is possible in their cured form to flex the base sheet member without risking peeling or flaking so that the openings in the flocked sheet members may be formed after the adhesive has been cured. It should also be understood that the openings in the sheet member may be formed prior to application of the flock material, but a more uniform attachment to the sheet member is achieved if the fibers are applied while the sheet member is flat. In practicing this invention, the adhesives may be cured in any suitable manner as by baking or air-drying.

The adhesive used in this invention may be any of those which can be readily applied to the sheet member, preferably in a liquid state, and provide a surface in which the ends of the fibers may readily embed themselves, after which the adhesive will be capable of being readily cured so that the fibers are tightly secured to the screen. Fibers so attached will withstand repeated cleanings by either washing or brushing for a long service life of the filter. Examples of suitable adhesives are paints such as used on farm machinery, synthetic resins and plastics, varnishes, rubber-based adhesives and the like. The choice of adhesive in many cases will depend upon the service conditions to which the filter will be subjected.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A fluid filtering medium comprising a sheet member composed of a stiff material that is adapted to retain a given shape and having slits therethrough, the sheet being expanded in a direction to spread open said slits to provide fluid passageways therethrough and provide surfaces of said member along opposite edges of the passageways inclined angularly to the plane of the sheet member, and a fibrous flock material secured to said sheet member and extending across said passageways, the flock fibres being attached at one end to said inclined surfaces and the fibres on opposed surfaces extending toward and overlapping each other at said passageways.

2. A fluid filtering medium comprising a sheet member composed of a stiff material that is adapted to retain a given shape and having substantially parallel rows of elongated spaced slits therethrough of substantially equal length, the slits in each row being substantially opposite the space between slits in adjacent rows, said sheet member being expanded in a direction to incline surfaces of the sheet member in relation to its plane surface before expansion, the amount of expansion and incline being sufficient to spread open said slits to provide fluid passageways therethrough, and a fibrous flock material attached to opposite sides of said sheet member, each fiber of said flock material being attached endwise to and substantially normal to, one of the inclined surfaces of said sheet member and extending transversely of said fluid passageways, the fibers on opposite sides of said sheet member at the edges of the opened slit forming the fluid passageways being closely adjoining along their lengths with the free ends of said adjoining fibers on one side of the member being adjacent the attached ends of the adjoining fibers on the opposite side of the sheet member.

3. A fluid filtering medium comprising a sheet member composed of a stiff material that is adapted to retain a given shape and having substantially parallel rows of elongated spaced slits therethrough of substantially equal length, the slits in each row being substantially opposite the space between slits in adjacent rows, said sheet member being expanded in a direction to incline surfaces of the sheet member in relation to its plane surface before expansion, the amount of expansion and incline being sufficient to spread open said slits to provide fluid passageways therethrough, and a fibrous flock material attached to opposite sides of said sheet member, each fiber of said material being attached endwise to and substantially normal to one of the inclined surfaces of said sheet member and extending transversely of said fluid passageways, the fibers on opposite sides of said sheet member at the edges of the open slits forming the fluid passageways being closely adjoining along their lengths with the free ends of said adjoining fibers on one side of the member being adjacent the attached ends of the adjoining fibers on the opposite side of the sheet member, and the amount of incline of the sheet member surfaces is greater than 45 degrees to incline said closely adjoining fibers toward each other to crowd the fibers together for progressively greater filtering action between opposite ends of the fluid passageways through said sheet member.

4. A fluid filtering medium comprising a sheet member composed of a stiff material that is adapted to retain a given shape and having substantially parallel rows of elongated spaced slits therethrough, the slits in individual rows being substantially opposite the space between slits in adjacent rows, said sheet member being expanded in a direction to spread open said slits to provide fluid passageways therethrough, and a fibrous flock material each fiber of which is attached endwise to and substantially normal to the portion of the opposite sides of said sheet member to which it is attached and extends transversely of said fluid passageways, said flock material having a length of at least one half the width of the fluid passageways through the sheet member.

5. A fluid filtering medium comprising a sheet member composed of a stiff material that is adapted to retain a given shape and having substantially parallel rows of fluid passageway openings therethrough, said passageways having substantially parallel inclined edge surfaces on opposite sides thereof formed from portions of said sheet member and extending angularly with respect to the plane of the sheet member, and fibrous flock material on opposite sides of said member having each fiber thereof attached at one of its ends to said surfaces, the free ends of the adjoining fibers on one side of the sheet member being closely adjacent the attached ends of the fibers on the opposite side of said sheet.

6. A filtering medium as defined in claim 5, wherein the fibers are substantially normal to said edge elements and the amount of incline of said edge elements is about 45 degrees to make the fibers on one side of the sheet member substantially parallel to the fibers on the opposite side of the sheet member.

7. In a method of making a fluid filtering medium comprised of a sheet member composed of a stiff material that is adapted to retain a given shape having fluid passageway openings therein and flock material attached to opposite sides thereof and extending transversely of said passageways; said method comprising the steps of coating with an adhesive a sheet member having substantially parallel rows of elongated spaced slits therethrough, the slits in adjacent rows being substantially opposite the space between slits in adjacent rows, attaching said flock material to said member whereby the individual fibers of the flock are substantially normal to said sheet member by first imparting substantial opposite electrostatic charges to said sheet member and said flock and thereafter contacting said sheet member with said flock material, and then expanding said sheet member to form said passageways and incline the surfaces of said sheet member which form opposite edge portions of said passageways at an angle to said sheet member whereby the free ends of the flock fibers on one side of the member are located closely adjacent the attached ends of the fibers on the opposite side of the sheet member.

8. In the method of making a fluid filtering medium comprised of a relatively stiff sheet member adapted to retain a given shape having fluid passageway openings therethrough and flock material attached to opposite sides thereof and extending transversely of said passageways; said method comprising the steps of coating said sheet member with an adhesive, attaching said flock material on the adhesive-coated surface of said sheet member whereby the individual fibers of said material are attached at one end thereof and extend substantially normal from the plane of said sheet, and forming said passageway openings in said sheet member and simultaneously including the surface portions of said sheet member on opposite sides of each said passageway openings whereby the fibers attached to said inclined surface portions extend transversely of said openings.

9. A fluid filtering medium comprising a sheet member composed of a stiff material that is adapted to retain a given shape and having substantially parallel rows of elongated spaced slits therethrough, the slits in individual rows being substantially opposite the space between slits in adjacent rows, said member being expanded in a direction to spread open said slits to provide fluid passageways therethrough and provide surfaces of said member along opposite edges of said passageways inclined angularly to the plane of the sheet member, and a fibrous flock material each fiber of which is attached endwise to and substantially normal to said surfaces on at least one side of said sheet member to which it is attached and extends transversely of said fluid passageways, said flock material having a length of at least one half the width of the fluid passageways through the sheet member.

References Cited in the file of this patent

UNITED STATES PATENTS

| | | |
|---|---|---|
| 801,404 | Schwartz | Oct. 10, 1905 |
| 1,757,690 | Strindberg | May 6, 1930 |
| 1,833,315 | Burhans | Nov. 24, 1931 |
| 2,351,142 | Mitchell | June 13, 1944 |
| 2,362,786 | Williams | Nov. 14, 1944 |
| 2,364,289 | Hale | Dec. 5, 1944 |
| 2,425,235 | Ferrante | Aug. 5, 1947 |
| 2,463,722 | Spraragen | Mar. 8, 1949 |
| 2,677,466 | Lowe | May 4, 1954 |
| 2,681,155 | Graham | June 15, 1954 |
| 2,740,184 | Thomas | Apr. 3, 1956 |
| 2,782,933 | Monsarrat | Feb. 26, 1957 |
| 2,819,800 | Goodloe | Jan. 14, 1958 |

UNITED STATES PATENT OFFICE

CERTIFICATE OF CORRECTION

Patent No. 3,019,186　　　　　　　　　　　　January 30, 1962

Milton A. Powers

It is hereby certified that error appears in the above numbered patent requiring correction and that the said Letters Patent should read as corrected below.

Column 3, lines 11 and 12, for "dimention" read -- dimension --; column 7, line 23, for "including" read -- inclining --.

Signed and sealed this 6th day of November 1962.

(SEAL)
Attest:

ERNEST W. SWIDER
Attesting Officer

DAVID L. LADD
Commissioner of Patents